(12) United States Patent
Mohandes et al.

(10) Patent No.: US 11,001,498 B2
(45) Date of Patent: May 11, 2021

(54) PREPARING HYDROXYAPITITE NANOSTRUCTURES

(71) Applicants: Fatemeh Mohandes, Tehran (IR); Hengameh Bakhtiar, Tehran (IR); Mohammadhosein Nekoofar, Tehran (IR); Seyed Naser Ostad, Tehran (IR); Abdolreza Simchi, Tehran (IR)

(72) Inventors: Fatemeh Mohandes, Tehran (IR); Hengameh Bakhtiar, Tehran (IR); Mohammadhosein Nekoofar, Tehran (IR); Seyed Naser Ostad, Tehran (IR); Abdolreza Simchi, Tehran (IR)

(*) Notice: Subject to any disclaimer, the term of this patent is extended or adjusted under 35 U.S.C. 154(b) by 14 days.

(21) Appl. No.: 16/137,810

(22) Filed: Sep. 21, 2018

(65) Prior Publication Data

US 2019/0023572 A1    Jan. 24, 2019

Related U.S. Application Data

(60) Provisional application No. 62/562,370, filed on Sep. 23, 2017.

(51) Int. Cl.
    *C01B 25/32* (2006.01)
(52) U.S. Cl.
    CPC .................... *C01B 25/32* (2013.01)
(58) Field of Classification Search
    CPC .................................................... C01B 25/32
    See application file for complete search history.

(56) References Cited

U.S. PATENT DOCUMENTS

2010/0143271 A1*  6/2010  Yang ............... A61Q 11/00
                                                424/52

OTHER PUBLICATIONS

Mahmud et al., "Chemical Characteristics of Hydroxyapatite from Oyster Shell by Thermo-Chemical Process," International Journal of Innovative Research in Science, Engineering and Technology, vol. 4, Issue 7, Jul. 2015, 5039-5047. (Year: 2015).*
Edralin et al., "Sonochemical synthesis, characterization and photocatalytic properties of hydroxyapatite nano-rods derived from mussel shells," Materials Letters 196 (2017) 33-36. Published online Mar. 6, 2017. (Year: 2017).*
Khiri et al., "The usability of ark clam shell (Anadara granosa) as calcium precursor to produce hydroxyapatite nanoparticle via wet precipitate method in various sintering temperature," Springer Plus (2016) 5:1206. (Year: 2016).*
Venkatesan et al., "Effect of Temperature on Isolation and Characterization of Hydroxyapatite from Tuna (Thunnus obesus) Bone," Materials 2010, 3, 4761-4772. (Year: 2010).*

* cited by examiner

*Primary Examiner* — Anthony J Zimmer
(74) *Attorney, Agent, or Firm* — Bajwa IP Law Firm; Haris Zaheer Bajwa

(57) ABSTRACT

Disclosed herein is a method for preparing hydroxyapatite structures from natural sources such as mammalian teeth and bones. The method may include obtaining a raw powder by grinding raw materials, obtaining a first mixture by mixing the raw powder with one of an alkali metal carbonate and an alkaline earth metal carbonate, and heating the first mixture at a first predetermined temperature for a first predetermined period.

10 Claims, 9 Drawing Sheets

PREPARING HYDROXYAPATITE NANOSTRUCTURES

CROSS-REFERENCE TO RELATED APPLICATION

This application claims the benefit of priority from U.S. Provisional Patent Application Ser. No. 62/562,370, filed on Sep. 23, 2017, and entitled "EXTRACTING NANO-STRUCTURED HYDROXYAPATITE COMPOUNDS FROM NATURAL RESOURCES AND BIO-WASTES," which is incorporated herein by reference in its entirety.

TECHNICAL FIELD

The present disclosure relates to methods for preparation of pure natural hydroxyapatite and carbonated hydroxyapatite particulates from natural resources such as mammalian teeth and bones.

BACKGROUND

Hydroxyapatite (HA) is an effective calcium phosphate compound which may be used in dental applications, fabrication of implants, and bone augmentation due to its favorable characteristics such as biocompatibility, bioactivity, and osteoconductivity. The performance of HA in the above-mentioned applications is impacted by average particle size and morphology of HA. Natural HA in mammalian teeth and bones have rod-like structures. Nano-sized HA structures are favorable in tissue engineering due to their very similar morphology, crystal structures, and chemical composition to natural apatite crystals, such as the apatite crystals of enamel.

Different methods, such as solid-state, wet-chemical, hydrothermal/solvothermal, sol-gel, micro emulsion, precipitation, microwave, pH shockwave, and mechano-chemical methods may be utilized for extracting and preparing HA structures. For preparation of HA structures via the above-mentioned methods, different calcium ion sources such as calcium acetate, calcium hydroxide, calcium oxalate, calcium nitrate, calcium carbonate, calcium oxide, calcium fluoride, calcium chloride, etc. and different phosphate ion sources such as orthophosphoric acid, ammonium hydrogen phosphates, group I phosphates (monobasic, dibasic, and tribasic potassium or sodium phosphate), trisodium phosphate and phosphorus pentoxide may be utilized. However, extraction or preparation of HA structures from natural sources such as mammalian bones and teeth is economically and environmentally preferable and moreover HA structures prepared utilizing the previously mentioned methods may show more biocompatibility.

Extraction of HA structures from natural sources such as mammalian bones and teeth may be possible by thermal decomposition of these natural sources at relatively high temperatures between 600° C. and 1400° C. which may be considered as unfavorable operational conditions since, for example, at high temperatures, natural HA of mammalian bones and teeth may convert to tricalcium phosphate and calcium oxide which significantly reduces the final amount of extracted HA. Moreover, without removing organic materials and pathogens from these natural sources, they are likely to transfer diseases in their clinical applications. There is therefore a need in the art, for methods of HA preparation from natural sources such as mammalian teeth and bones that may allow for separating the HA structures including HA nanostructures at relatively lower temperatures. There is further a need in the art for low-temperature HA preparation methods that allow for controlling the morphology and the average particles size of the prepared HA structures and nanostructures for different tissue engineering applications.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments, the present disclosure is directed to a method for preparing hydroxyapatite structures from natural sources such as mammalian teeth and bones. The method may include obtain a raw powder by grinding raw materials, obtaining a first mixture by mixing the raw powder with one of an alkali metal carbonate and an alkaline earth metal carbonate, and heating the first mixture at a first predetermined temperature for a first predetermined period.

According to an exemplary embodiment, grinding raw materials may include grinding the raw materials to obtain the raw powder with an average particle size between 40 and 500 micrometers.

According to an exemplary embodiment, obtaining the first mixture may include mixing the prepared raw materials with an alkali metal carbonate, the alkali metal carbonate concentration between 10 wt. % and 50 wt. % based on total weight of the first mixture. According to an embodiment, the alkali metal carbonate may be one of $Na_2CO_3$, $K_2CO_3$, $NaHCO_3$, and combinations thereof.

According to another exemplary embodiment, obtaining the first mixture may include mixing the prepared raw materials with an alkaline earth metal carbonate, the alkaline earth metal carbonate concentration between 10 wt. % and 50 wt. % based on total weight of the first mixture. According to an embodiment, the alkaline earth metal carbonate may be one of $CaCO_3$, $BaCO_3$, $MgCO_3$, $SrCO_3$, and combinations thereof.

According to an exemplary embodiment, heating the first mixture at the first predetermined temperature for the first predetermined period may include heating the first mixture at a temperature between 280° C. and 1000° C. for a period between 120 minutes and 240 minutes.

According to another exemplary embodiment, heating the first mixture at the first predetermined temperature for the first predetermined period may include heating the first mixture at a temperature between 200° C. and 300° C. for a period between 200 minutes and 240 minutes.

According to one or more exemplary embodiments, the present disclosure is directed to a method for preparing hydroxyapatite structures. The method may include obtaining a raw powder by grinding raw materials, obtaining a second mixture by dissolving the raw powder in an inorganic acid, the inorganic acid one of HCl, $HNO_3$, $H_3PO_4$, and mixtures thereof, obtaining a clear aqueous solution by removing collagenous gels and organic impurities by centrifuging the second mixture, precipitating hydroxyapatite from the clear solution by mixing an alkaline solution with the clear solution, obtaining a dispersion by dispersing the precipitated hydroxyapatite into a solvent selected from the group consisting of ethanol, methanol, 2-propanol, 1-butanol, ethylene glycol, and mixtures thereof to, and heating the dispersion in an autoclave at a second predetermined temperature.

According to an exemplary embodiment, obtaining the second mixture may include dissolving the raw powder in the inorganic acid with a concentration between 1.0% and 3.0% (w/v).

According to an exemplary embodiment, precipitating hydroxyapatite from the clear solution may include mixing the alkaline solution with the clear solution to obtain a mixture with a pH between 10 and 12. According to an exemplary embodiment, the alkaline solution may be one of NaOH, KOH, $NaHCO_3$, $Na_2CO_3$, $NH_3$, and mixtures thereof.

According to an exemplary embodiment, obtaining the dispersion may include dispersing the precipitated hydroxyapatite into the solvent with a concentration between 0.2 and 0.5% (w/v).

According to an exemplary embodiment, removing collagenous gels and organic impurities by centrifuging the second mixture includes centrifuging the second mixture at 12000-15000 rpm.

According to an exemplary embodiment, heating the dispersion in an autoclave at a second predetermined temperature includes heating the dispersion in the autoclave at a temperature between 180° C. and 200° C.

According to one or more exemplary embodiments of the present disclosure, the raw materials may include mammalian teeth, mammalian bones, and combinations thereof.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
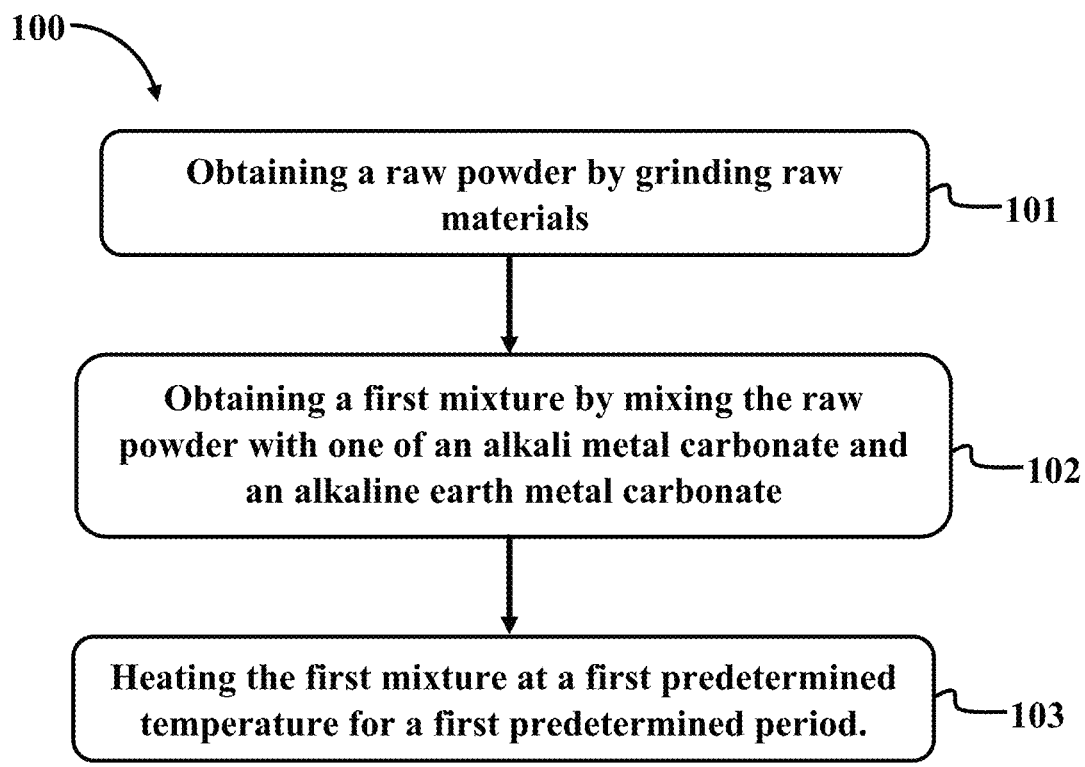
FIG. 1 illustrates a method for preparing hydroxyapatite nanostructures, consistent with one or more exemplary embodiments of the present disclosure.

In the following detailed description, numerous specific details are set forth by way of examples to provide a thorough understanding of the relevant teachings related to the exemplary embodiments. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Disclosed herein is a method for preparing hydroxyapatite structures with suitable morphologies from natural resources such as mammalian bones and teeth as raw materials. According to one or more exemplary embodiments of the present disclosure, hydroxyapatite structures including hydroxyapatite nanostructures may be prepared by thermal decomposition of the natural raw materials such as mammalian bones and teeth in the presence of an alkali metal carbonate or an alkaline earth metal carbonate at low temperatures, for example, temperatures less than 300° C. According to one or more exemplary embodiments of the present disclosure, hydroxyapatite structures including hydroxyapatite nanostructures may be prepared by subjecting the natural raw materials such as mammalian bones and teeth to a solvothermal process where collagenous gels and organic impurities may first be removed from the raw materials by dissolving the raw materials in an inorganic acid and then centrifuging the resultant mixture. After removal of the impurities, hydroxyapatite may be precipitated from the remaining solution by adding an alkaline solution to the mixture and then the precipitated hydroxyapatite may be dispersed in a suitable solvent and the resultant dispersion may be heated to obtain desired hydroxyapatite structures. According to an exemplary embodiment, changing the solvent may affect the final morphology of the prepared hydroxyapatite structures. The disclosed methods, according to exemplary embodiments of the present disclosure, allow for preparation of hydroxyapatite structures and nanostructures with preferred morphologies from natural raw materials such as mammalian bones and teeth at relatively mild operational conditions, for example at low temperatures.

FIG. 1 illustrates a method 100 for preparing hydroxyapatite nanostructures, consistent with one or more exemplary embodiments of the present disclosure. Method 100 may include step 101 of obtaining a raw powder by grinding raw materials, step 102 of obtaining a first mixture by mixing the raw powder with one of an alkali metal carbonate and an alkaline earth metal carbonate, and step 103 of heating the first mixture at a first predetermined temperature for a first predetermined period.

Referring to FIG. 1, according to one or more exemplary embodiments, step 101 of obtaining the raw powder may include grinding raw materials to obtain a raw powder with an average particle size between 40 and 500 micrometers. According to an exemplary embodiment, the raw materials may be one of mammalian bones and teeth. Mammalian bones and teeth may be crushed, ground, and then meshed with 45-500 micrometer sieves to obtain the raw powder with the desired average particle size. The mammalian bones and teeth powder, which is referred to herein as the raw powder, may further be sterilized by washing the raw powder with an alcohol such as ethanol under UV irradiation and then washing the raw powder with ethylene oxide. The raw powder may further be lyophilized to obtain a dry raw powder. According to an exemplary embodiment, the mammalian bones and teeth may first be cleaned by washing the mammalian bones and teeth with hydrogen peroxide and applying ultrasonic waves in order to remove soft tissues. Then, the bones and teeth may be washed with sodium chloride and distilled water. After that, the bones and teeth may be dried in an oven at a temperature between 70° C. and 100° C. for approximately 24 hours. Then, the dried and cleaned bones and teeth may be crushed and grinded to obtain the raw powder.

Referring to FIG. 1, according to one or more exemplary embodiments, step 102 may involve mixing the raw powder with one of an alkali metal carbonate and an alkaline earth metal carbonate to obtain the first mixture. According an exemplary embodiment, mixing the raw powder with one of an alkali metal carbonate and an alkaline earth metal carbonate may include mixing the raw powder with an alkali metal carbonate such as $Na_2CO_3$, $K_2CO_3$, $NaHCO_3$, or combinations thereof. The alkali metal carbonate may be mixed with the raw powder such that the alkali metal carbonate has a concentration between 10 wt. % and 50 wt. % based on total weight of the first mixture. According to another exemplary embodiment, mixing the raw powder with one of an alkali metal carbonate and an alkaline earth metal carbonate may include mixing the raw powder with an alkaline earth metal carbonate including $CaCO_3$, $BaCO_3$, $MgCO_3$, $SrCO_3$, or combinations thereof. The alkaline earth metal carbonate may be mixed with the raw powder such that the alkaline earth metal carbonate has a concentration between 10 wt. % and 50 wt. % based on total weight of the first mixture.

Referring to FIG. 1, according to one or more exemplary embodiments, step 103 of heating the first mixture at a first predetermined temperature for a first predetermined period may include heating the first mixture at atmospheric pressure and a temperature less than 300° C. for a period between 120 minutes and 240 minutes. According to an exemplary embodiment, the first predetermined temperature may be between 200° C. and 300° C. and the first predetermined period may be between 200 minutes and 240 minutes.

Figure 2:
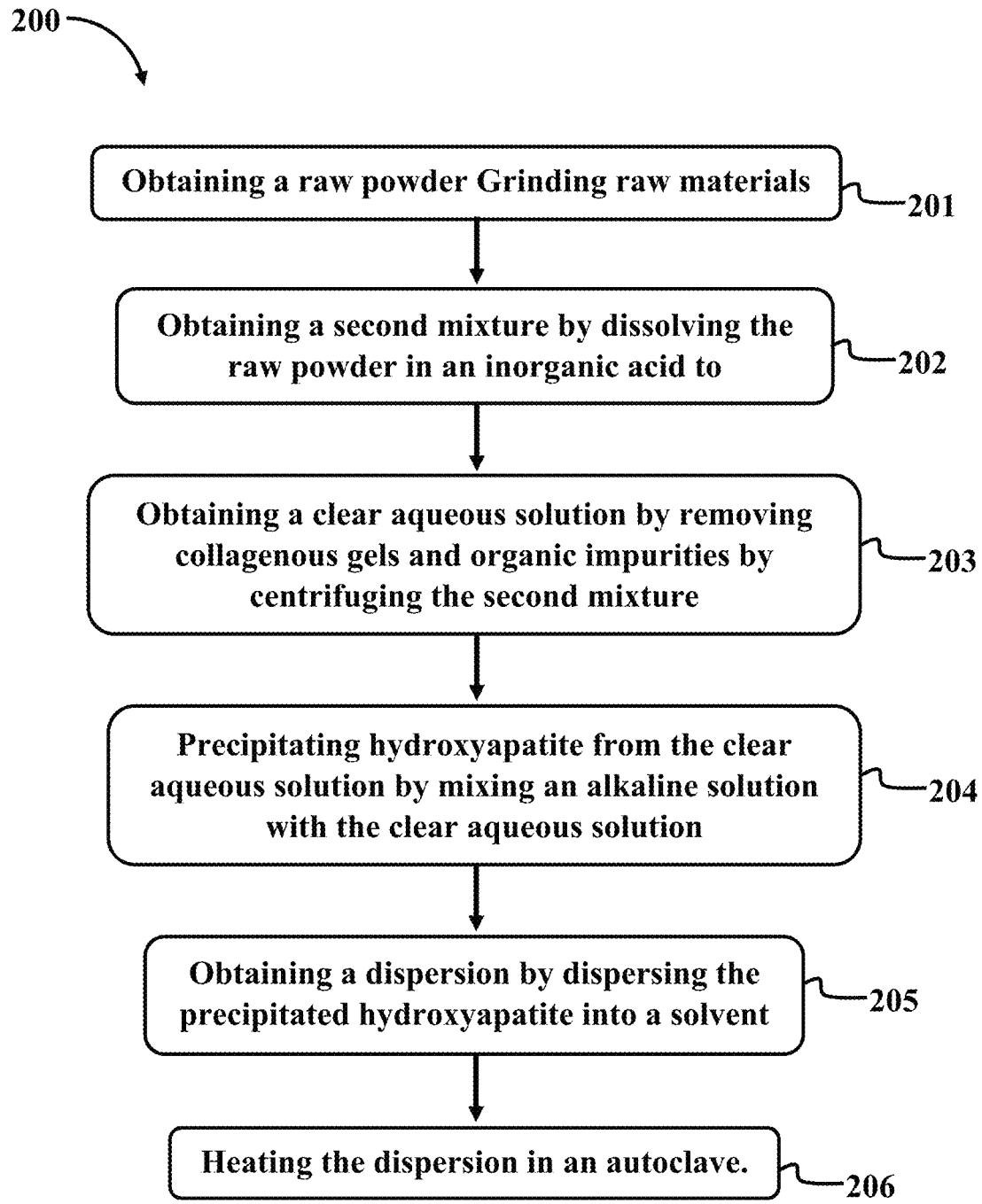
FIG. 2 illustrates a method for preparing hydroxyapatite structures, consistent with one or more exemplary embodiments of the present disclosure.

FIG. 2 illustrates a method 200 for preparing hydroxyapatite structures, consistent with one or more exemplary embodiments of the present disclosure. Method 200 may include step 201 of obtaining a raw powder by grinding raw materials, step 202 of obtaining a second mixture by dissolving the raw powder in an inorganic acid, step 203 of obtaining a clear solution removing collagenous gels and organic impurities by centrifuging the second mixture, step 204 of precipitating hydroxyapatite from the clear solution by mixing an alkaline solution with the clear aqueous solution, step 205 of obtaining a dispersion by dispersing the precipitated hydroxyapatite into a solvent to, and step 206 of heating the dispersion in an autoclave at a second predetermined temperature.

Referring to FIG. 2, according to one or more exemplary embodiments, step 201 may involve obtaining a raw powder with an average particle size between 40 and 500 micrometers by grinding raw materials. According to an exemplary embodiment, the raw materials may be one of mammalian bones and teeth. Mammalian bones and teeth may be crushed, ground, and then meshed with 45-500 micrometer sieves to obtain the raw powder with the desired average particle size. The mammalian bones and teeth powder, which is referred to herein as the raw powder, may further be sterilized by washing the raw powder with an alcohol such as ethanol under UV irradiation and then washing the raw powder with for example ethylene oxide. The raw powder may further be lyophilized to obtain a dry raw powder. According to another exemplary embodiment, the mammalian bones and teeth may first be cleaned washing the mammalian bones and teeth with hydrogen peroxide and applying ultrasonic waves in order to remove soft tissues. Then, the bones and teeth may be washed with sodium chloride and distilled water. After that, the bones and teeth may be dried in an oven at a temperature between 70° C. and 100° C. for approximately 24 hours. Then the dried and cleaned bones and teeth may be crushed and grinded to obtain the raw powder.

Referring to FIG. 2, according to one or more exemplary embodiments, step 202 may include obtaining a second mixture by dissolving the raw powder in an inorganic acid, such as HCl, $HNO_3$, $H_3PO_4$, or mixtures thereof. According to an exemplary embodiment, the raw powder may be dissolved in the inorganic acid with a concentration between 1.0% and 3.0% (w/v) to obtain the second mixture and then the second mixture may be stirred overnight. After stirring, the collagenous gels and other solids appear as floating particles in the second mixture and may be removed by centrifuging the second mixture.

Referring to FIG. 2, according to one or more exemplary embodiments, step 203 may involve obtaining the clear solution by removing the collagenous gels and organic impurities by centrifuging the second mixture. According to an exemplary embodiment, the second mixture may be centrifuged at approximately 12000 to 15000 rpm to remove the collagenous gels and organic impurities from the second mixture and what remains is the clear solution that contains hydroxyapatite.

Referring to FIG. 2, according to one or more exemplary embodiments, step 204 of precipitating hydroxyapatite from the clear solution by mixing an alkaline solution with the clear solution may include mixing an alkaline solution such as NaOH, KOH, $NaHCO_3$, $Na_2CO_3$, $NH_3$, or mixtures thereof with the clear solution to rise the pH of the clear solution to a pH of approximately 10 to 12. Once the pH is adjusted between 10 and 12, the hydroxyapatite may precipitate from the clear solution.

Referring to FIG. 2, according to one or more exemplary embodiments, step 205 of obtaining a dispersion may involve separating the hydroxyapatite precipitate from the clear solution and then dispersing the precipitated hydroxyapatite into a solvent such as ethanol, methanol, 2-propanol, 1-butanol, ethylene glycol, or mixtures thereof. According to an exemplary embodiment, the precipitated hydroxyapatite is dispersed into the solvent with a concentration between 0.2% and 0.5% (w/v). Solvents such as ethanol, methanol, 2-propanol, 1-butanol, ethylene glycol, or mixtures thereof may affect the morphology of the final hydroxyapatite nanostructure which will be described in detail in connection with Examples below.

Referring to FIG. 2, according to one or more exemplary embodiments, step 206 may include heating the dispersion in an autoclave at a second predetermined temperature. According to an exemplary embodiment, the second predetermined temperature may be between 180° C. and 200° C. According to an implementation, after heating the dispersion in the oven, the resultant hydroxyapatite structure may be washed several times with an alcohol or distilled water and then the resultant hydroxyapatite structure may be dried at a temperature of approximately 50° C.

Example 1

In this example, hydroxyapatite structures are synthesized from human teeth in both the presence and absence of one of sodium carbonate. In this exemplary embodiment, human teeth are first grinded to obtain a raw powder with an average particle size of 45 micrometers. A first sample of hydroxyapatite was prepared by mixing the raw powder with sodium carbonate ($Na_2CO_3$) to obtain a first mixture in which $Na_2CO_3$ has a concentration of approximately 30 wt. % based on the weight of the raw powder. After that, the first mixture is heated at a temperature of approximately 300° C. for a period of approximately 240 minutes to obtain nano-sized carbonated hydroxyapatite, which is referred to herein as Sample 1. A second sample of hydroxyapatite was prepared by heating the raw powder at a temperature of approximately 800° C. for a period of approximately 200 minutes to obtain hydroxyapatite, which is referred to herein as Sample 2.

Figure 3A:
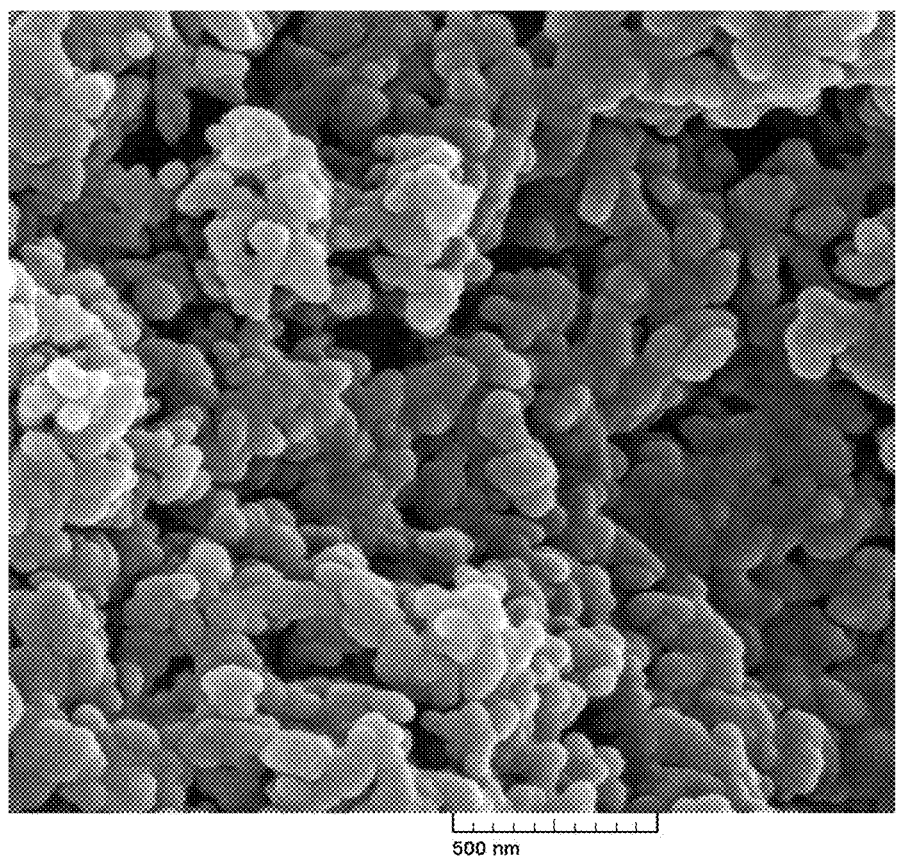
FIG. 3A illustrates a scanning electron microscope (SEM) image of Sample 1, according to an exemplary embodiment of the present disclosure described in connection with Example 1.

FIG. 3A illustrates a scanning electron microscope (SEM) image of Sample 1, according to an exemplary embodiment of the present disclosure described in connection with Example 1. Referring to FIG. 3A, it may be observed that the carbonated hydroxyapatite is nanostructured. In the presence of an alkali metal carbonate such as $Na_2CO_3$ in the first mixture, nano-structured hydroxyapatite may be prepared by thermal decomposition of the first mixture at a relatively low temperature of 300° C. as confirmed by FIG. 3A in this exemplary embodiment.

Figure 3B:
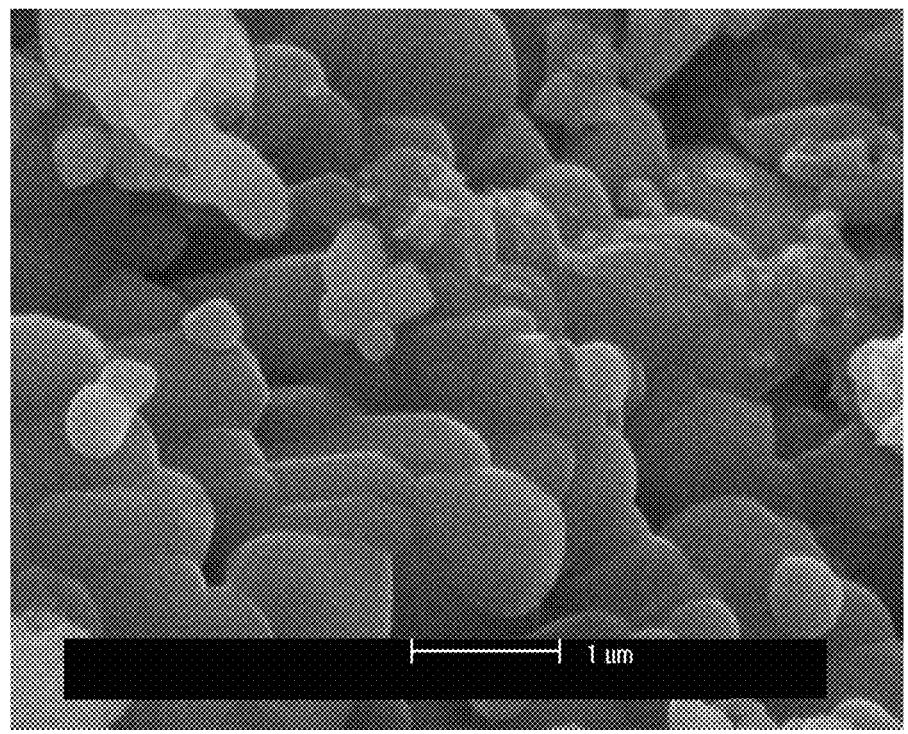
FIG. 3B illustrates an SEM image of Sample 2, according to an exemplary embodiment of the present disclosure described in connection with Example 1.

FIG. 3B illustrates an SEM image of Sample 2, according to an exemplary embodiment of the present disclosure described in connection with Example 1. Referring to FIG. 3B, it may be observed that, in the absence of an alkali metal carbonate such as $Na_2CO_3$ in the raw powder, at a higher temperature of 800° C., the prepared hydroxyapatite shows a non-uniform particle size distribution.

Figure 4A:
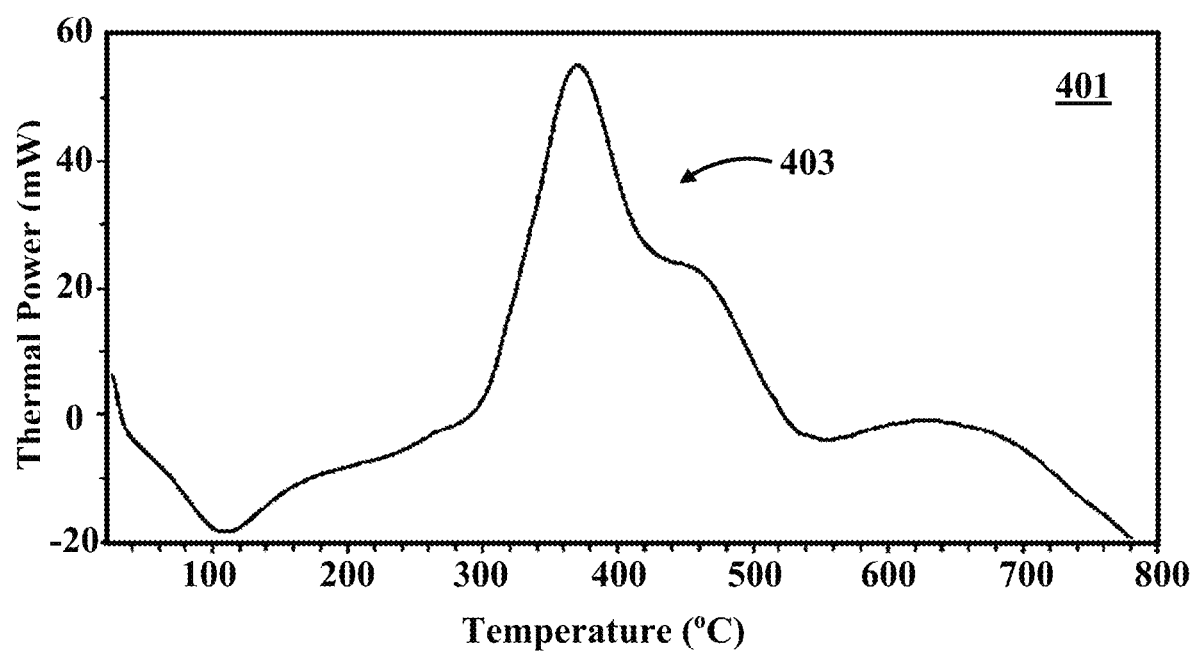
FIG. 4A illustrates a differential scanning calorimetry (DSC) curve obtained for the raw powder of Example 1.
Figure 4B:
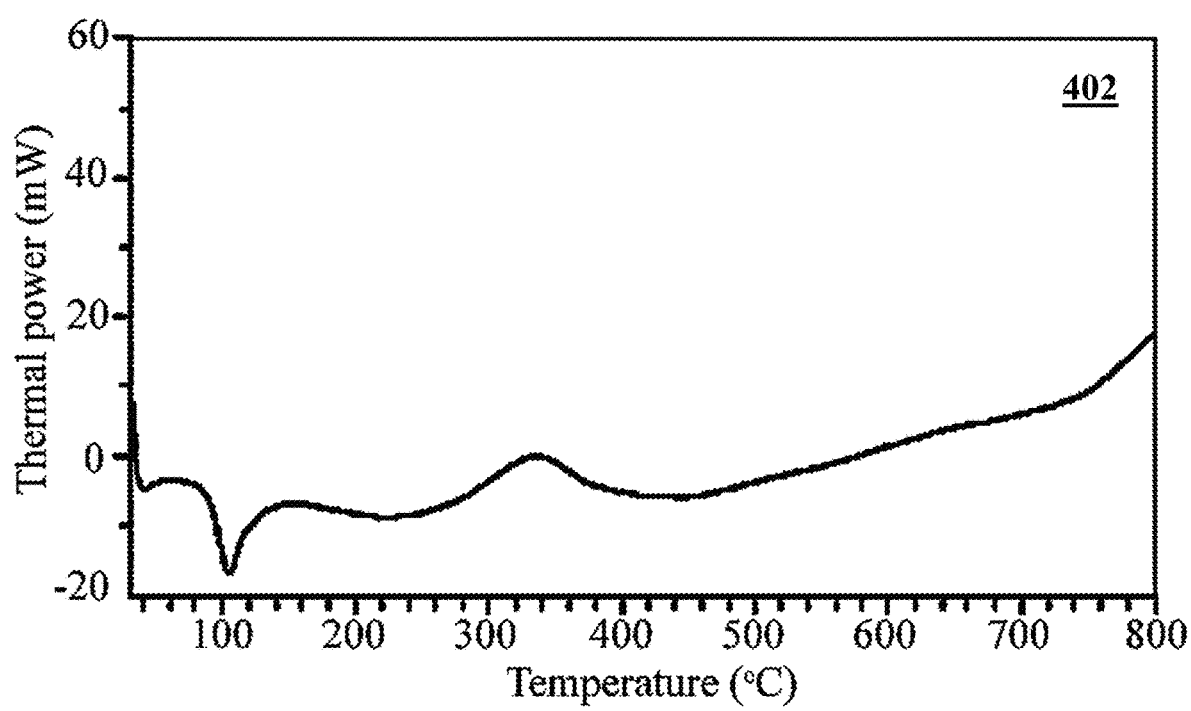
FIG. 4B illustrates a DSC curve obtained for the raw powder mixed with $Na_2CO_3$, according to the exemplary embodiment of Example 1.

FIG. 4A illustrates a differential scanning calorimetry (DSC) curve 401 obtained for the raw powder of Example 1, and FIG. 4B illustrates a DSC curve 402 obtained for the raw powder mixed with $Na_2CO_3$, according to the exemplary embodiment of Example 1. Referring to FIGS. 4A and 4B, an exothermic peak 403 appears in the range of 300-600° C. in DSC curve 401 obtained for the raw powder in the absence of $Na_2CO_3$, while this exothermic curve disappears in DSC curve 402 obtained for the raw powder mixed with $Na_2CO_3$. This thermodynamic effect of $Na_2CO_3$ as an alkali metal carbonate on the thermal decomposition of the raw powder may help reduce the temperature at which thermal decomposition occurs and allows for obtaining hydroxyapatite structures by heating the mixture of the raw powder and the alkali metal carbonate at relatively lower temperatures of for example less than 300° C. Conducting the thermal decomposition method at such lower temperatures increases the yield of natural HA extraction from mammalian bones and teeth, since at higher temperatures natural HA of mammalian bones and teeth may at least in part convert to tricalcium phosphate and calcium oxide which reduces the final amount of extracted HA.

Example 2

In this example, hydroxyapatite structures are synthesized from mammalian bones and teeth according to method 200 of FIG. 2, in which ethylene glycol is used as the solvent. In this exemplary embodiment, mammalian bones and teeth were first grinded to obtain a raw powder with an average particle size of 250 micrometers. Then the raw powder was dissolved in a 1.0-2.0 N HCl solution under magnetic stirring overnight to obtain a second mixture with a concentration of approximately 3.0 (w/v) %. After a few hours of stirring, the collagenous gels and other solids that appear as floating particles were removed by centrifuging the second mixture at 12000-15000 rpm, and a clear solution was obtained. At room temperate, an alkaline solution of 1.0-2.0N $NH_3$ was added to the clear solution to rise the pH value from 1-2 to 10-12 and as a result hydroxyapatite precipitated from the clear solution. After being washed and dried, the hydroxyapatite precipitate was dispersed in ethylene glycol with a concentration of approximately 0.5 w/v % and was transferred into an autoclave to be heated at 200° C. for 240 min.

Figure 5:
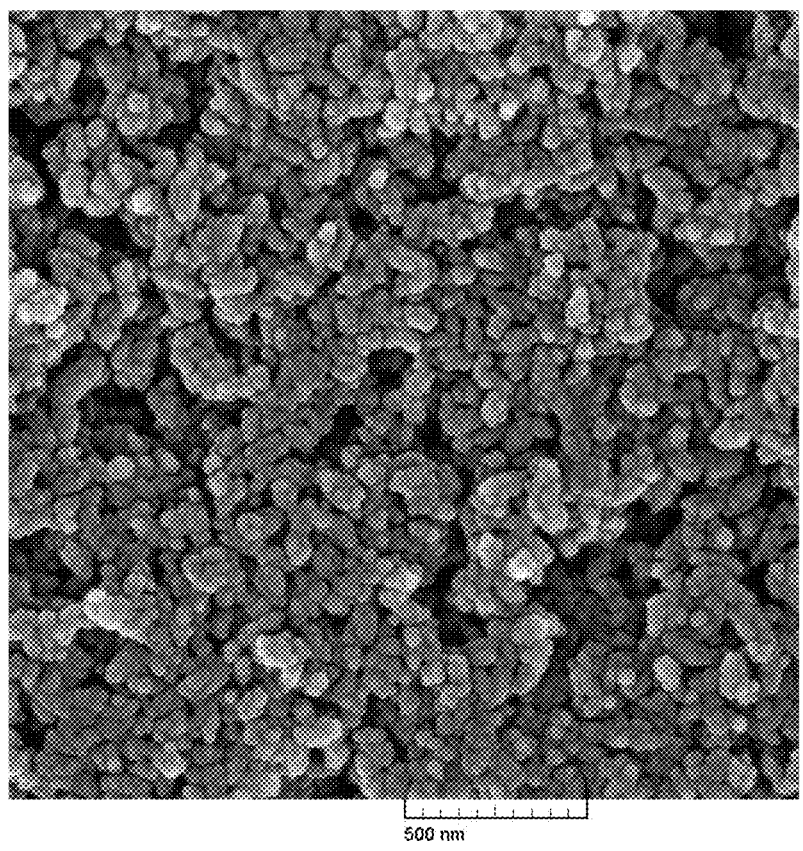
FIG. 5 illustrates an SEM image of a hydroxyapatite structure obtained as described in connection with Example 2.

FIG. 5 illustrates an SEM image of a hydroxyapatite structure obtained as described in connection with Example 2. Referring to FIG. 5, the nano-sized and uniform particle distribution of the synthesized hydroxyapatite of Example 2 is shown.

Example 3

In this example, hydroxyapatite structures are synthesized from mammalian bones and teeth according to exemplary method 200 of FIG. 2, in which distilled water is used as the solvent. In this exemplary embodiment, mammalian bones and teeth were first grinded to obtain a raw powder with an average particle size of 250 micrometers. Then the raw powder was dissolved in a 1.0-2.0 N HCl solution under magnetic stirring overnight to obtain a second mixture with a concentration of approximately 3.0 (w/v) %. After a few hours of stirring, the collagenous gels and other solids that appear as floating particles were removed by centrifuging the second mixture at 12000-15000 rpm, and a clear solution was obtained. At room temperate, an alkaline solution of 1.0-2.0N $NH_3$ was added to the clear solution to rise the pH value from 1-2 to 10-12 and as a result hydroxyapatite precipitated from the clear solution. After being washed and dried, the hydroxyapatite precipitate was dispersed in distilled water with a concentration of approximately 0.5 w/v % and was transferred into an autoclave to be heated at 200° C. for 240 min.

Figure 6:
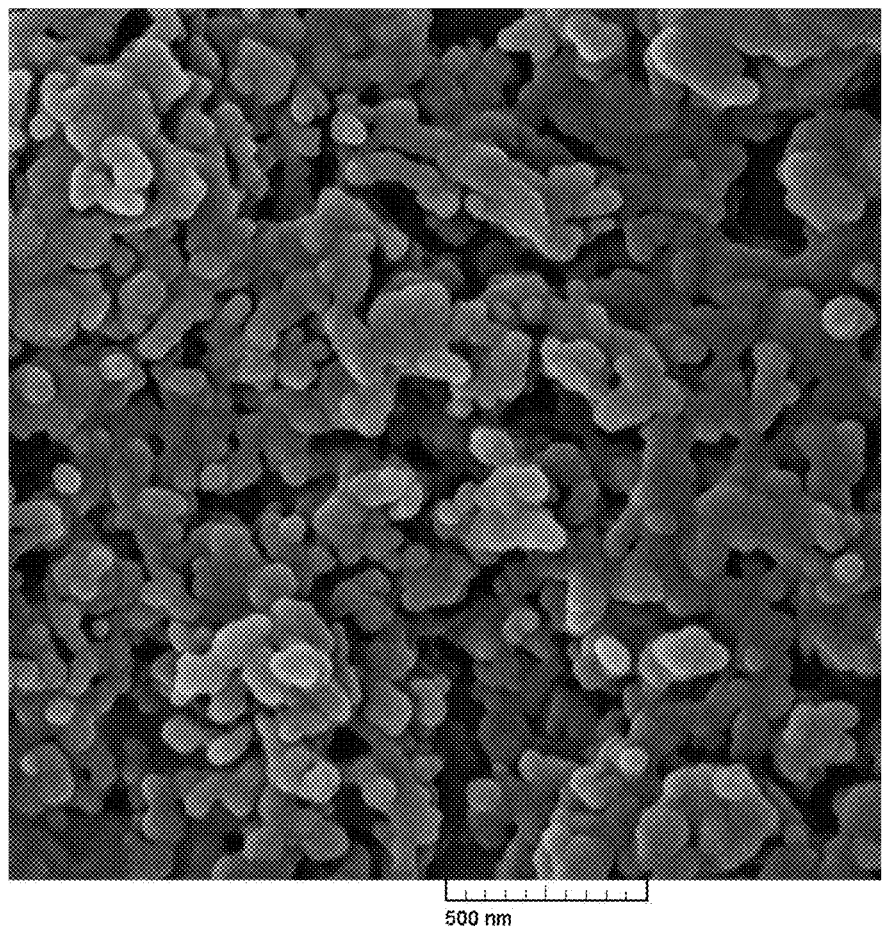
FIG. 6 illustrates an SEM image of a hydroxyapatite structure obtained as described in connection with Example 3.

FIG. 6 illustrates an SEM image of a hydroxyapatite structure obtained as described in connection with Example 3. Referring to FIG. 6, the adhesion of the particles in the hydroxyapatite structure is high when distilled water is used as the solvent.

Example 4

In this example, hydroxyapatite structures are synthesized from mammalian bones and teeth according to exemplary method 200 of FIG. 2, in which methanol is used as the solvent. In this exemplary embodiment, mammalian bones and teeth were first grinded to obtain a raw powder with an average particle size of 250 micrometers. Then the raw powder was dissolved in a 1.0-2.0 N HCl solution under magnetic stirring overnight to obtain a second mixture with a concentration of approximately 3.0 (w/v) %. After a few hours of stirring, the collagenous gels and other solids that appear as floating particles were removed by centrifuging the second mixture at 12000-15000 rpm, and a clear solution was obtained. At room temperate, an alkaline solution of 1.0-2.0N $NH_3$ was added to the clear solution to rise the pH value from 1-2 to 10-12 and as a result hydroxyapatite precipitated from the clear solution. After being washed and dried, the hydroxyapatite precipitate was dispersed in methanol with a concentration of approximately 0.5 w/v % and was transferred into an autoclave to be heated at 200° C. for 240 min.

Figure 7:
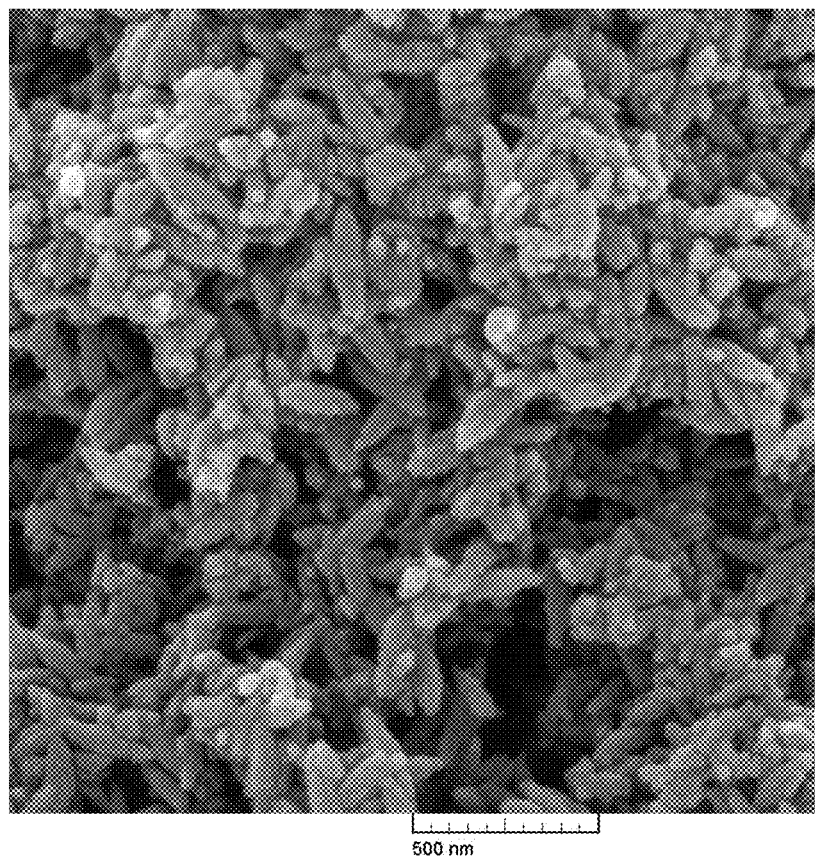
FIG. 7 illustrates an SEM image of a hydroxyapatite structure obtained as described in connection with Example 4.

FIG. 7 illustrates an SEM image of a hydroxyapatite structure obtained as described in connection with Example 4. Referring to FIG. 7, self-arrangement of hydroxyapatite nanoparticles into cone-shaped structures is shown. Examples 2, 3, and 4 show the effect of the solvent on the morphology of the prepared hydroxyapatite structures.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for preparing hydroxyapatite nanostructures, the method comprising:
   obtaining a raw powder by grinding raw materials;
   obtaining a second mixture by dissolving the raw powder in an inorganic acid, the inorganic acid one of HCl, $HNO_3$, $H_3PO_4$, and mixtures thereof;
   obtaining a clear aqueous solution by removing collagenous gels and organic impurities by centrifuging the second mixture;
   precipitating hydroxyapatite from the clear solution by mixing an alkaline solution with the clear solution;
   obtaining a dispersion by dispersing the precipitated hydroxyapatite into a solvent selected from the group consisting of ethanol, methanol, 2-propanol, 1-butanol, ethylene glycol, and mixtures thereof; and
   heating the dispersion in an autoclave at a second predetermined temperature.

2. The method according to claim 1, wherein obtaining a raw powder by grinding raw materials includes obtaining the raw powder, by grinding raw materials, with an average particle size between 40 and 500 micrometers.

3. The method according to claim 1, wherein obtaining the second mixture by dissolving the raw powder in the inorganic acid includes dissolving the raw powder in the inorganic acid with a concentration between 1.0% and 3.0% (w/v).

4. The method according to claim 1, wherein precipitating hydroxyapatite from the clear solution includes mixing the alkaline solution with the clear solution to reach a pH between 10 and 12.

5. The method according to claim 4, wherein the alkaline solution one of NaOH, KOH, $NaHCO_3$, $Na_2CO_3$, $NH_3$, and mixtures thereof.

6. The method according to claim 1, wherein obtaining the dispersion by dispersing the precipitated hydroxyapatite into the solvent includes dispersing the precipitated hydroxyapatite into the solvent with a concentration between 0.2 and 0.5% (w/v).

7. The method according to claim 1, wherein removing collagenous gels and organic impurities by centrifuging the second mixture includes centrifuging the second mixture at 12000-15000 rpm.

8. The method according to claim 1, wherein heating the dispersion in an autoclave at a second predetermined temperature includes heating the dispersion in the autoclave at a temperature between 180° C. and 200° C.

9. The method according to claim 1, wherein the raw materials include mammalian teeth, mammalian bones, and combinations thereof.

10. A method for preparing hydroxyapatite nanostructures, the method comprising:

obtaining a raw powder with an average particle size between 40 and 500 micrometers by grinding raw materials;

obtaining a second mixture with a concentration between 1.0% and 3.0% (w/v), the inorganic acid one of HCl, $HNO_3$, $H_3PO_4$, and mixtures thereof by dissolving the raw powder in an inorganic acid;

obtaining a clear aqueous solution by removing collagenous gels and organic impurities by centrifuging the second mixture;

precipitating hydroxyapatite from the clear solution by mixing an alkaline solution with the clear solution;

obtaining a dispersion with a precipitated hydroxyapatite concentration between 0.2 and 0.5% (w/v) by dispersing the precipitated hydroxyapatite into a solvent selected from the group consisting of ethanol, methanol, 2-propanol, 1-butanol, ethylene glycol, and mixtures thereof; and heating the dispersion in an autoclave at a temperature between 180° C. and 200° C.

* * * * *